United States Patent
Oike et al.

(10) Patent No.: US 8,820,158 B2
(45) Date of Patent: Sep. 2, 2014

(54) LIQUID LEVEL DETECTING DEVICE

(75) Inventors: Toshio Oike, Shizuoka (JP); Kenichi Tanaka, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/356,344

(22) Filed: Jan. 23, 2012

(65) Prior Publication Data

US 2012/0186341 A1     Jul. 26, 2012

(30) Foreign Application Priority Data

Jan. 24, 2011   (JP) .................................. 2011-012181

(51) Int. Cl.
*G01F 23/32*   (2006.01)
*G01F 23/36*   (2006.01)
*G01D 5/165*   (2006.01)
*G01F 23/00*   (2006.01)

(52) U.S. Cl.
CPC .............. *G01D 5/165* (2013.01); *G01F 23/363* (2013.01)
USPC .......................................... 73/317; 73/290 R (58) Field of Classification Search
USPC .......... 73/290 R, 290 B, 318, 320, 305–322.5
See application file for complete search history.

(56) References Cited

U.S. PATENT DOCUMENTS

| | | | |
|---|---|---|---|
| 6,142,018 A * | 11/2000 | Dedert et al. .................... | 73/305 |
| 6,389,892 B1 * | 5/2002 | Sato et al. .................... | 73/304 R |
| 6,518,873 B1 | 2/2003 | O'Regan et al. | |
| 6,972,685 B2 | 12/2005 | Sato et al. | |
| 7,111,510 B2 * | 9/2006 | Tadoa et al. .................. | 73/304 R |
| 8,671,751 B2 | 3/2014 | Shimizu et al. | |
| 2005/0040930 A1 * | 2/2005 | Dedert et al. .................. | 338/160 |
| 2010/0223993 A1 * | 9/2010 | Shimizu et al. .................. | 73/317 |

FOREIGN PATENT DOCUMENTS

| | | |
|---|---|---|
| JP | 2003-287456 A | 10/2003 |
| JP | 2003287455 A | 10/2003 |
| JP | 2003287457 A | 10/2003 |
| JP | 2005503012 A | 1/2005 |
| JP | 2009-162694 A | 7/2009 |
| JP | 2012168151 A | 9/2012 |
| WO | 03042640 A | 5/2003 |

OTHER PUBLICATIONS

Japanese Office Action dated Jul. 2, 2014 issued in corresponding Japanese Patent Application No. 2011-012181.

* cited by examiner

*Primary Examiner* — Peter Macchiarolo
*Assistant Examiner* — Jamar Ray
(74) *Attorney, Agent, or Firm* — Sughrue Mion, PLLC (57) ABSTRACT

A liquid level detecting device includes a resistor plate having conductive segments, a float that vertically moves in accordance with a displacement of a liquid level, a float arm that has one end to which the float is attached and the other end which is rotatably supported so as to be rotated in association with a vertical movement of the float, and a contact point that slides on the conductive segments in association with a rotation of the float arm. Each of the conductive segments is formed of a first metallic material and a second metallic material. The first metallic material has silver (Ag) and palladium (Pd) and the second metallic material has gold (Au) as a main component. A part which is to be brought into contact with the contact point in each of the conductive segments is formed of the second metallic material.

6 Claims, 5 Drawing Sheets

LIQUID LEVEL DETECTING DEVICE

BACKGROUND

The present invention relates to a liquid level detecting device. In detail, the invention relates to a liquid level detecting device that automatically detects a residual amount of a liquid stored in a fuel tank for transportation of an automobile, an air plane or the like on the basis of a position of a liquid level of the liquid.

In the past, as a liquid level detecting device that detects a height of a liquid level in a fuel tank of, for example, an automobile, one is known which is adapted to detect a height of a liquid level in such a manner that a float arm is slid on a resistor plate by a float which vertically moves in association with the liquid level of the liquid and the liquid level is converted into an electric potential.

Figure 1:
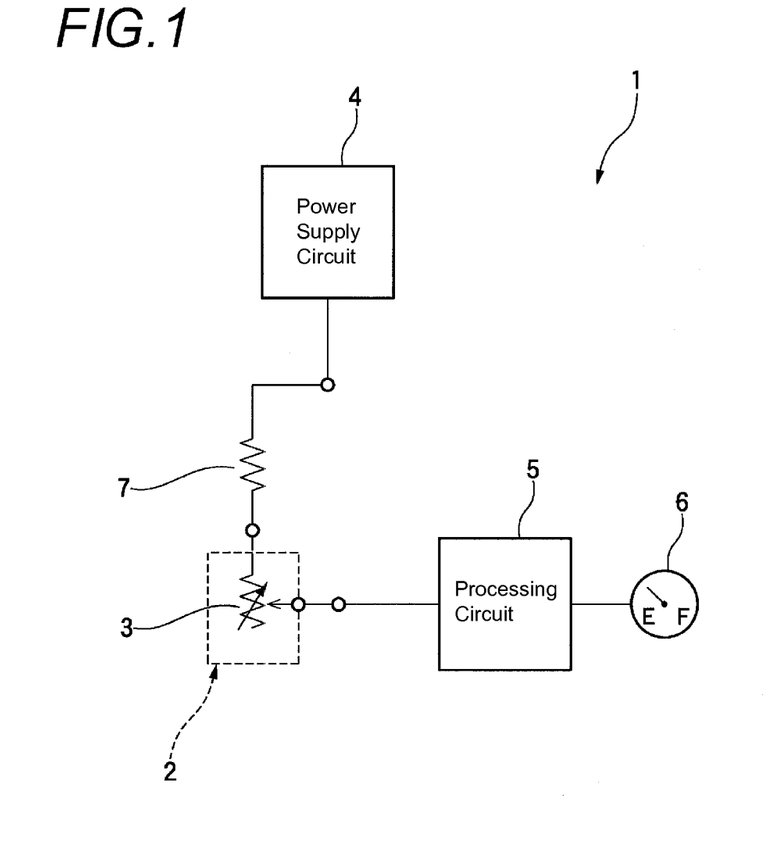
FIG. 1 is an electric block diagram explanatorily showing a structural example of a sensor used in a liquid level detecting device according to the invention or related art.
Figure 2:
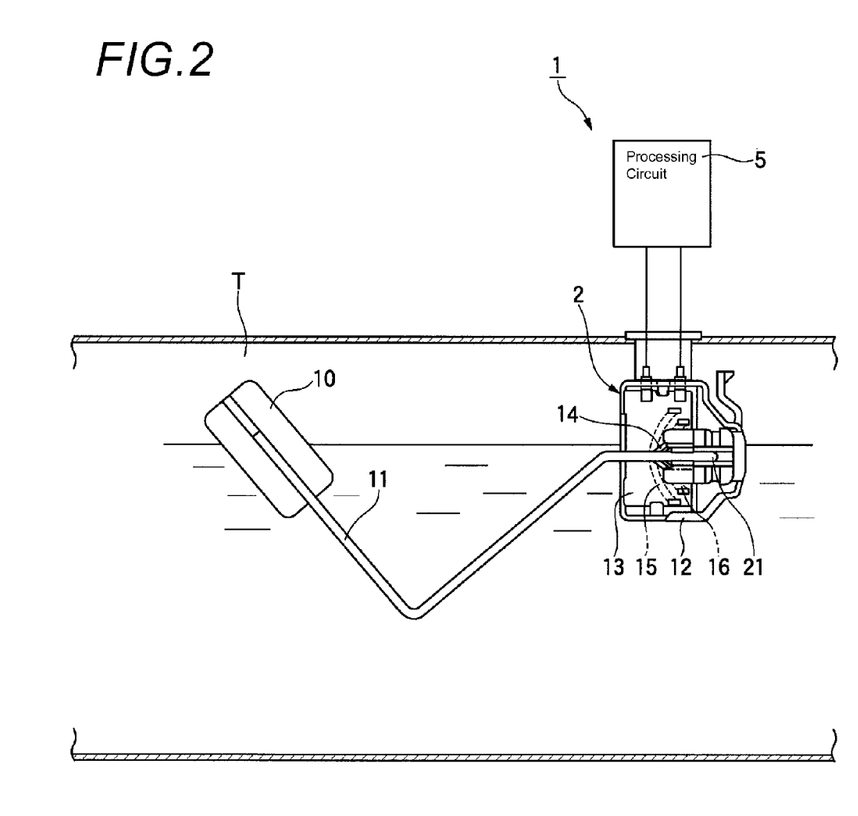
FIG. 2 is a schematic view explanatorily showing a structural example of the liquid level detecting device according to the invention or related art.
Figure 3:
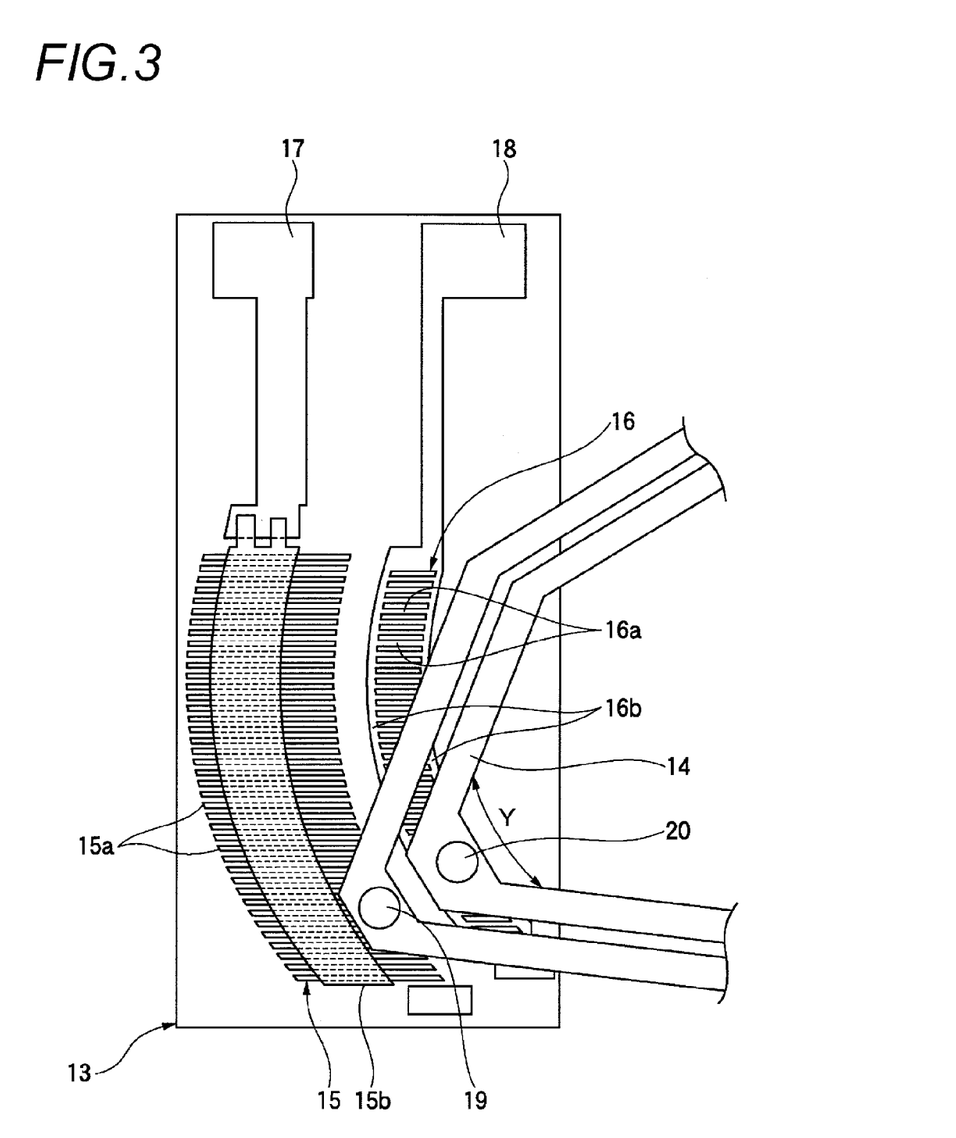
FIG. 3 is a schematic view explanatorily showing a structural example of a variable resistor in a sensor according to the invention or related art.

Here, an example of a liquid level detecting device is described below. FIG. 1 is an electric block diagram for explanatorily showing a structural example of a sensor used in a liquid level detecting device according to the invention and the related art. FIG. 2 is a schematic view explanatorily showing a structural example of the liquid level detecting device according to the invention and the related art. FIG. 3 is a schematic view explanatorily showing a structural example of a variable resistor in the sensor according to the invention and the related art.

A sensor 2 of a liquid level detecting device 1 has a variable resistor 3 of which the resistance value is changed in a process in which contact points 19 and 20 (described later) move in association with variation in height of a liquid level in a liquid-tight container T. The variable resistor 3 is serially connected to a fixed resistor 7 and is connected to a power supply circuit 4 that applies a predetermined voltage to the variable resistor 3 and the fixed resistor 7.

As shown in FIGS. 2 and 3, the sensor 2 has a resistor plate 13 attached to a body frame 12 and a sliding unit contact element 14 attached to the other end of a float arm 11 having, attached to its tip portion, a float 10 capable of floating at a liquid level by a buoyant force of a liquid. The resistor plate 13 of the sensor 2 is provided with a first conductive pattern 15 and a second conductive pattern 16. The two conductive patterns 15 and 16 are arranged such that they are formed in arc shapes centering around a rotation shaft 21 of the float arm 11 so as to be parallel to each other. A conductive section 17 for inputting/outputting is connected to one end of the first conductive pattern 15 and a conductive section 18 for inputting/outputting is connected to one end of the second conductive pattern 16.

The first conductive pattern 15 is formed of a plurality of conductive segments 15a which are arranged in the circumferential direction of the arc shape at a predetermined interval and a resistor 15b which mutually and electrically connects the plurality of conductive segments 15a. In addition, the second conductive pattern 16 is formed of a plurality of conductive segments 16a which are arranged in the circumferential direction of the arc shape at a predetermined interval and a resistor 16b which mutually and electrically connects the plurality of conductive segments 16a.

The sliding unit contact element 14 is provided with two contact points 19 and 20 which are electrically connected to each other. In addition, a rotation shaft 21 positioned at the other end of the float arm 11 is coupled to the sliding unit contact element 14. The float arm 11 is rotated in the direction of arrow Y in FIG. 3 about the rotation shaft 21 as a fulcrum in association with movement of the float 10 floating at a liquid level, the float 10 being moved downward from a position of the liquid level in a full-up state corresponding to an amount of a consumed liquid. In association with the rotation of the float arm 11, the sliding unit contact element 14 is also rotated in the direction of arrow Y in FIG. 3. By the rotational movement of the sliding unit contact element 14, the contact points 19 and 20 are electrically brought into contact with the respective conductive segments 15a and 16a arranged on the first conductive pattern 15 and the second conductive pattern 16 while sliding on the respective conductive segments 15a and 16a. With this, the length of the resistor 15b interposed in a circuit provided between the conductive section 17 for inputting/outputting connected to the first conductive pattern 15 and the conductive section 18 for inputting/outputting connected to the second conductive pattern 16, is changed so that a resistance value of the circuit is change (That is, the resistance value of the variable resistor 3 in FIG. 1 is change). Thus, the variable resistor 3 is formed of the first conductive pattern 15, the second conductive pattern 16 and the sliding unit contact element 14.

A voltage is applied to the variable resistor 3, the sensor 2 detects an electric potential difference between the conductive section 17 for inputting/outputting and the conductive section 18 for inputting/outputting and outputs the detected signal to a processing circuit 5, and the processing circuit displays a residual amount of the liquid on a display device such as a meter 6 or the like by an analogue or bar graph on the basis of the output signal of the sensor 2. Meanwhile, a fixed resistor can be disposed on a wiring line with the processing circuit 5 in the meter 6.

In such a liquid level detecting device, a silver-palladium (AgPd) alloy, a silver-copper (AgCu) alloy, a silver-Nickel (AgNi) alloy, or the like is generally used for a material of the contact point. The conductive segment is formed of, for example, a mixture of powders of silver-palladium (AgPd) and glass, which is obtained in such a manner that silver powders, palladium powders and glass powders are mixed to produce a mixture in pasty form, the mixture in pasty form is printed on a resistor plate to be dried, and then it is baked.

Meanwhile, a liquid level detecting device is sometimes used for a fuel tank of an automobile which uses, as a fuel, an electrolysis solution (alcohol) itself such as ethanol, methanol or the like, or gasoline containing the electrolysis solution. While silver (Ag) has a small electric resistance and superior conductivity, the contact point or the conductive segment is deteriorated or corroded by a sulfur content, moisture, alcohol or the like in the fuel so that a malfunction such as impossibility of measuring, detection of a wrong value, or the like possibly occurs due to a failure of conduction. Further, in the recent fuel circumstances over the world, there are many chances that a fuel having various compositions is used so that it is necessary to prevent the above malfunction so as to provide a fuel meter having a reliability. With that, a technique is known that a part on which a contact point of a conductive segment is slid, is covered with an alloy containing gold (Au) in order to prevent the conductive segment or the contact point from being deteriorated or corroded (See, for example, JP-A-2003-287456 and JP-A-2009-162694).

In accordance with techniques of JP-A-2003-287456 and JP-A-2009-162694, while there is effectiveness in antideterioration and anticorrosion of the conductive segment, a cover layer becomes thin with the lapse of time so that continual effectiveness is possibly insufficient. In addition, in order to ensure the sufficient antideterioration and anticorrosion, it is necessary to cause the conductive segment to contain much gold (Au) (for example, approximately 40% by mass or more in the conductive segment) so that a problem arises that the cost is increased.

SUMMARY

The invention is made in view of the above described circumstances, and the purpose of the invention is to provide a liquid level detecting device capable of securing the antideterioration and anticorrosion in usage under not only a normal environment but also a condition of existence of a sulfur component, and of suppressing the manufacturing cost.

The purpose of the invention can be achieved by the following aspects (1) to (6).

(1) A liquid level detecting device comprising:

a resistor plate having a plurality of conductive segments;

a float that vertically moves in accordance with a displacement of a liquid level of a liquid to be measured;

a float arm that has one end to which the float is attached and the other end which is rotatably supported so as to be rotated in association with a vertical movement of the float; and a contact point that slides on the plurality of conductive segments in association with a rotation of the float arm in accordance with the liquid level of the liquid, wherein each of the plurality of conductive segments is formed of a first metallic material and a second metallic material;

wherein the first metallic material has silver (Ag) and palladium (Pd) and the second metallic material has gold (Au) as a main component; and wherein a part which is to be brought into contact with the contact point in each of the plurality of conductive segments is formed of the second metallic material.

(2) The liquid level detecting device according to the aspect (1), wherein each of the plurality of conductive segments is shaped into a long member, and has a central portion which is provided on the resistor plate and both side portions which are provided on the resistor plate so as to sandwich the central portion therebetween in viewed from a cross section perpendicular to a longitudinal direction of the long member; and wherein the central portion is formed of the second metallic material and each of the side portions is formed of the first metallic material.

(3) The liquid level detecting device according to the above aspect (1), wherein each of the plurality of conductive segments is shaped into a long member, and has a base portion which is provided on the resistor plate and an apex portion which is superposed on an upper part of the base portion in viewed from a cross section perpendicular to a longitudinal direction of the long member; and wherein base portion is formed of the first metallic material and the apex portion is formed of the second metallic material.

(4) The liquid level detecting device according to any of the aspects (1) to (3), the second metallic material contains 95% by mass or more of gold (Au).

(5) The liquid level detecting device according to any of the aspects (1) to (4), wherein the second metallic material contains a glass component.

(6) The liquid level detecting device according to any of the aspects (1) to (5), wherein the first metallic material contains gold (Au).

Advantage of the Invention

With the invention, each of the plurality of conductive segments is formed of the first metallic material containing at least silver (Ag) and palladium (pd) and the second metallic material containing gold (Au) as a main component, and at least a part which is to be brought into contact with the contact point, in each of the plurality of conductive segments, is formed of the second metallic material. Therefore, it is possible to provide the liquid level detecting device which has sufficient antideterioration and anticorrosion even when a gasoline containing a large amount of a sulfur component or any of various blended fuels is used. That is, while slight abrasion progresses on the conductive segment and the contact point due to sliding between them, gold (Au) separated from the second metallic material due to the abrasion of the second metallic material is transferred on a sliding face. The transfer of the gold (Au) occurs on a portion between the conductive segment and the contact point. The transfer of the gold (Au) on the sliding face prevents deterioration due to sulfurization of the sulfur component, corrosion, oxidization or the like so that conductivity in contact between the conductive segment and the contact point can be adequately maintained, and thereby a contact failure of the contact point can be prevented. In addition, since it is not necessary to use gold (Au) for the entirety of each of the conductive segments, the usage amount of gold (Au) can be reduced to be less than heretofore. Consequently, the cost of materials can be cut down so that the manufacturing cost of the liquid level detecting device can be reduced.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 4A and 4B are schematic views explanatorily showing a structural example of a conductive segment of the liquid level detecting device according to a first embodiment of the invention, where FIGS. 5A and 5B are schematic views explanatorily showing a structural example of a conductive segment in the liquid level detecting device according to a second embodiment of the invention, where

DETAILED DESCRIPTION OF EXEMPLARY EMBODIMENTS

An embodiment of the invention is described below in detail. Meanwhile, a side of a resistor plate where a conductive pattern is formed, is referred to as "upper side" in the descriptions of the invention.

A basic structure of a liquid level detecting device according to the invention has been described in detail in the above descriptions of the related art with reference to FIGS. 1, 2 and 3. However, it is described again below.

As shown in FIG. 1, the sensor 2 of the liquid level detecting device 1 has the variable resistor 3 of which the resistance value is changed in a process in which contact points 19 and 20 (described later) moves in association with variation in height of a liquid level in a liquid-tight container T. The variable resistor 3 is serially connected to the fixed resistor 7 and is connected to the power supply circuit 4 that applies a predetermined voltage to the variable resistor 3 and the fixed resistor 7.

As shown in FIGS. 2 and 3, the sensor 2 has the body frame 12, and the resistor plate 13 and the sliding unit contact element 14a which are attached to the body frame 12. A base end section of the float arm 11 having, attached to its tip portion, the float 10 capable of floating at a liquid level by a buoyant force of liquid is coupled to the sliding unit contact element 14. The resistor plate 13 of the sensor 2 is provided with the first conductive pattern 15 and the second conductive pattern 16. The two conductive patterns 15 and 16 arranged such that they are formed in arc shapes centering around the rotation shaft 21 of the float arm 11 so as to be parallel to each other. The conductive section 17 for inputting/outputting is connected to one end of the first conductive pattern 15 and the conductive section 18 for inputting/outputting is connected to one end of the second conductive pattern 16.

The first conductive pattern 15 is formed of the plurality of conductive segments 15a which are arranged in the circumferential direction of the arc shape at a predetermined interval and the resistor 15b which mutually and electrically connects the plurality of conductive segments 15a. In addition, the second conductive pattern 16 is formed of the plurality of conductive segments 16a which are arranged in the circumferential direction of the arc shape at a predetermined interval and the resistor 16b which mutually and electrically connects the plurality of conductive segments 16a. Each of the conductive segments 15a and 16a is constituted by a long member, and is disposed to be roughly parallel to the adjacent conductive segments. The first conductive pattern 15 and the second conductive pattern 16 are arranged to be separated from each other.

The sliding unit contact element 14 has two frame bodies which are coaxial with each other about the base end section of the float arm 11, and the two frame bodies are provided with the respective contact points 19 and 20 and are electrically connected to each other. The rotation shaft 21 positioned at the base end section of the float arm 11 is coupled to the sliding unit contact element 14.

The float arm 11 is rotated in the direction of arrow Y in FIG. 3 about the rotation shaft 21 as a fulcrum in association with movement of the float 10 floating at a liquid level, the float 10 being moved downward from a position of the liquid level in a full-up state corresponding to an amount of a consumed liquid. In association with the rotation of the float arm 11, the sliding unit contact element 14 is also rotated in the direction of arrow Y in FIG. 3. By the rotational movement of the sliding unit contact element 14, the contact point 19 is electrically brought into contact with the conductive segments 15a arranged on the first conductive pattern 15 while sliding thereon, and the contact point 20 is electrically brought into contact with the conductive segments 16a arranged on the second conductive pattern 16 while sliding thereon. With this, the length of the resistor 15b interposed in a circuit provided between the conductive section 17 for inputting/outputting connected to the first conductive pattern 15 and the conductive section 18 for inputting/outputting connected to the second conductive pattern 16, is changed so that a resistance value of the circuit is change (That is, a resistance value of the variable resistor 3 in FIG. 1 is changed). Thus, the variable resistor 3 is formed of the first conductive pattern 15, the second conductive pattern 16 and the sliding unit contact element 14.

A voltage is applied to the variable resistor 3, the sensor 2 detects an electric potential difference between the conductive section 17 for inputting/outputting and the conductive section 18 for inputting/outputting and outputs the detected signal to a processing circuit 5, and the processing circuit 5 displays a residual amount of the liquid on a display device such as a meter or the like by an analogue or bar graph on the basis of the output signal of the sensor 2. Meanwhile, a fixed resistor can be provided on a wiring line with the processing circuit 5 in the meter 6.

In the invention, each of the plurality of conductive segments 15a and 16a forming the first conductive pattern 15 and the second conductive pattern 16 is formed of a first metallic material which contains at least silver (Ag) and palladium (Pd) and a second metallic material which contains gold (Au) as a main component. At least a part which is to be brought into contact with the contact point, in each of the plurality of conductive segments 15a and 16a is formed of the second metallic material.

Figure 4A:
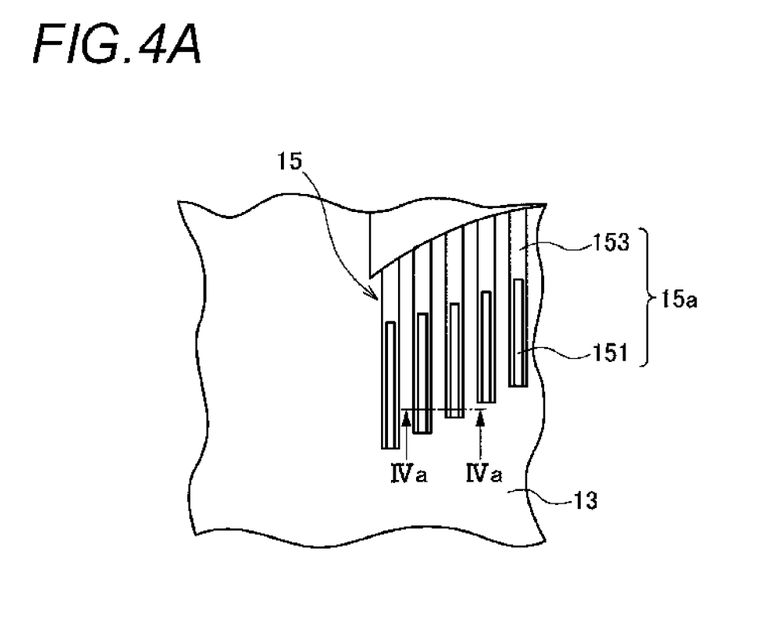
FIG. 4A is a partial exploded view of the conductive segment and FIG. 4B is a cross sectional view of the conductive segment taken along a line IVa-IVa in FIG. 4A.
Figure 4B:
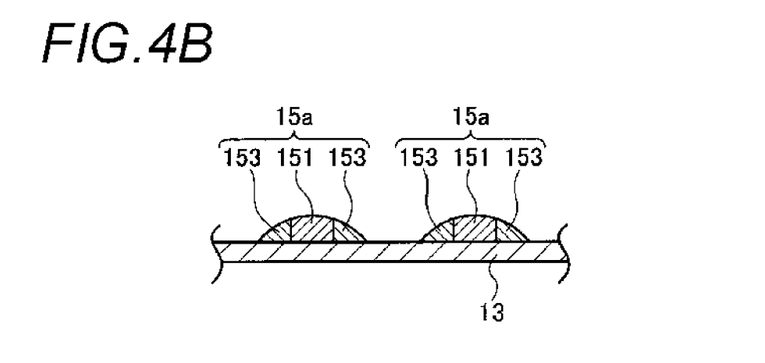

FIGS. 4A and 4B are schematic views explanatorily showing a structural example of a conductive segment of a first embodiment in the liquid level detecting device according to the invention. FIG. 4A is a partial exploded view of the conductive segment and FIG. 4B is a cross sectional view of the conductive segment taken along a line IVa-IVa in FIG. 4A.

As shown in FIGS. 4A and 4B, each of the conductive segments 15a is constituted by a long member, and is formed in a roughly semicircular shape including a part in an arc shape in viewed from a cross section perpendicular to the longitudinal direction of the long member. The conductive segment 15a has a central portion 151 which is brought into contact with the resistor plate 13 and side sections 153 which sandwich the central portion 151 and are brought into contact with the resistor plate 13. In the first embodiment, the central portion 151 as a part to be brought into contact with the contact point is formed of the second metallic material and each of the side sections 153 is formed of the first metallic material.

Since the first metallic material is formed of at least silver (Ag) and palladium (Pd), it is possible to enhance a hardness of the conductive segment 15a so as to ensure abrasion durability thereof and to form a conductive pattern excellent in the conductivity.

In the invention, gold (Au) can be blended in the first metallic material. By blending gold (Au) in the first metallic material, it is possible to achieve the liquid level detecting device having better antideterioration and anticorrosion with respect to a fuel such as gasoline or the like.

Meanwhile, the first metallic material can contain any other metallic material unless the effect of the invention is impaired. As any other metallic material, for example, cobalt (Co), nickel (Ni), ruthenium (Ru), copper (Cu), platinum (Pt) and the like can be listed. Regarding the above metallic materials, it is possible to use independent one of or mixed two or more of metallic materials.

The second metallic material has gold (Au) as a main component, it is preferable that the second metallic material contains 95% by mass or more of gold (Au), and it is more preferable that the second metallic material contains 98% by mass or more of gold (Au). Since the second metallic material contains 95% by mass or more of gold (Au), it is possible to sufficiently enhance the antideterioration and the anticorrosion.

In addition, it is preferable that the second metallic material contains a glass component. The existence of the glass component induces an effect of increasing the hardness of the conductive segment. As the glass component, lead borosilicate glass, bismuth oxide or the like can be listed.

In the invention, the second metallic material can contain any other metallic material unless the effect of the invention is impaired. As any other metallic material, for example, cobalt (Co), nickel (Ni), ruthenium (Ru), copper (Cu), platinum (Pt), palladium (Pd) and the like can be listed. Regarding the above metallic materials, it is possible to use independent one of or mixed two or more of metallic materials. It is preferable that the second metallic material contains 5% by mass or less of another material or other materials.

As a method of forming the conductive segment 15a (entirely, the conductive pattern 15) of the first embodiment, first, powders of the first metallic material are mixed with a solvent together with a binder to produce a mixture in pasty form, the mixture in pasty form is printed on the resistor plate 13 by means of screen printing or the like, and then a drying process is applied thereto. At that time, the first metallic material made to be the mixture in pasty form is printed on a portion excluding the central portion 151 to be formed of the second metallic material. Next, powders of the second metallic material are mixed with a solvent together with a binder to produce a mixture in pasty form, and the mixture in pasty form is printed on the resistor plate 13 at portions of the central portions 151 of the respective conductive segments by means of screen printing or the like. After that, a drying process is applied thereto. Finally, by baking the entirety of the resistor plate 13, the conductive pattern 15 in which the plurality of conductive segments 15a are arranged, is formed, each of the conductive segments 15a being configured to have the central portion 151 formed of the second metallic material and the side sections 153 formed of the first metallic material and positioned at the respective both sides of the central portion 151.

In accordance with the first embodiment, as described above, gold (Au) separated from the second metallic material due to the abrasion of the second metallic material forming the central portion 151 is transferred on a sliding face between the conductive segments 15a and the contact point 19 so that deterioration due to sulfurization of the sulfur component, corrosion, oxidization or the like can be prevented, conductivity in contact between the conductive segments 15a and the contact point 19 can be adequately maintained, and thereby a contact failure of the contact point can be prevented. In addition, the separated gold (Au) is also transferred to the contact point 19 abraded by sliding, which also contributes to prevention of a contact failure of the contact point. Further, by forming the side sections 153 by the first metallic material, the abrasion resistance of the entirety of the conductive segments 15a can be improved. Moreover, since gold (Au) is not used for the entirety of the conductive segments 15a, it is possible to reduce the usage amount of gold (Au) to be lower than heretofore.

Figure 5A:
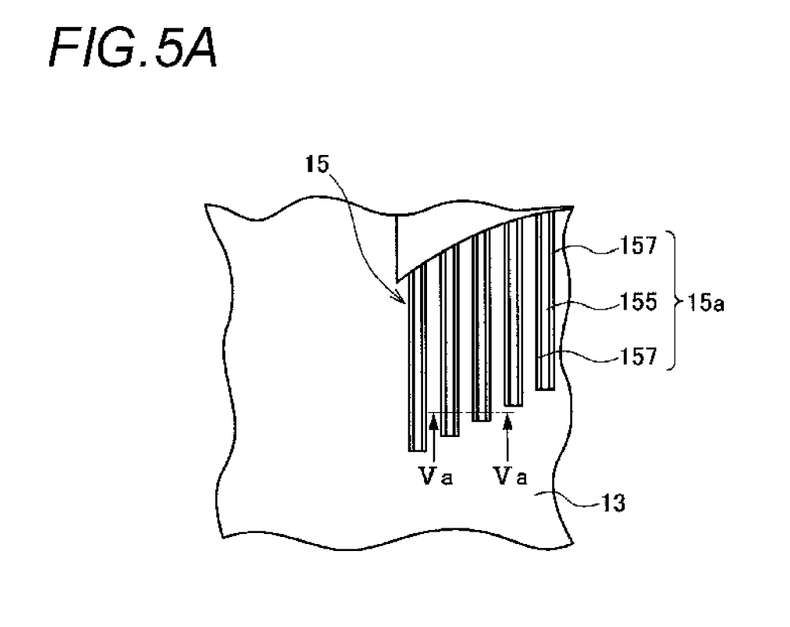
FIG. 5A is a partial exploded view of the conductive segment and FIG. 5B is a cross sectional view of the conductive segment taken along a line Va-Va in FIG. 5A.
Figure 5B:
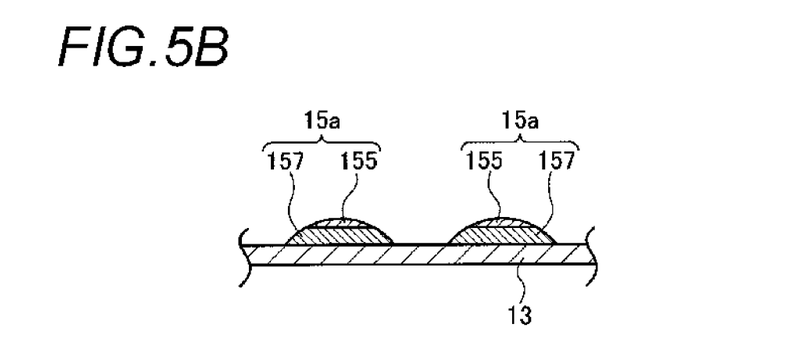

FIGS. 5A and 5B are schematic views explanatorily showing a structural example of a conductive segment in the liquid level detecting device according to a second embodiment of the invention. FIG. 5A is a partial exploded view of the conductive segment and FIG. 5B is a cross sectional view of the conductive segment taken along a line Va-Va in FIG. 5A. As shown in FIGS. 5A and 5B, each of the conductive segments 15a is constituted by a long member, and is formed in a roughly semicircular shape including a part in an arc shape when viewed from a cross section perpendicular to the longitudinal direction of the long member. Each of the conductive segments 15a is formed of a base portion 157 to be brought into contact with the resistor plate 13 and an apex portion 155 superposed on the upper part of the base portion 157. In the second embodiment, the base portion 157 is formed of the first metallic material and the apex portion 155 as a part to be brought into contact with the contact point is formed of the second metallic material.

In the second embodiment, the first metallic material and the second metallic material can be respectively the same as the first metallic material and the second metallic material in the first embodiment.

As a method of forming the conductive segments 15a (entirely, the conductive pattern 15) of the second embodiment, first, powders of the first metallic material are mixed with a solvent together with a binder to produce a mixture in pasty form, the mixture in pasty form is printed on the resistor plate 13 by means of screen printing or the like, and then a drying process is applied thereto.

Next, powders of the second metallic material are mixed with a solvent together with a binder to produce a mixture in pasty form, and the mixture in pasty form is printed on the resistor plate 13 at portions of the central portions 151 of the respective conductive segments by means of screen printing or the like similarly to the above. After that, a drying process is applied thereto.

Finally, by baking the entirety of the resistor plate 13, the conductive pattern 15 in which the plurality of conductive segments 15a are arranged, is formed, each of the conductive segments 15a being configured to have the base portion 157 formed of the first metallic material and the apex portion 155 formed of the second metallic material laminated on the upper part of the base portion 157.

In accordance with the second embodiment, as described above, gold (Au) separated from the second metallic material due to the abrasion of the second metallic material forming the apex portion 155 is transferred on a sliding face between the conductive segments 15a and the contact point 19, deterioration due to sulfurization of the sulfur component, corrosion, oxidization or the like can be prevented, conductivity in contact between the conductive segments 15a and the contact point 19 can be adequately maintained, and thereby a contact failure of the contact point can be prevented. In addition, the separated gold (Au) is also transferred to the contact point 19 abraded by sliding, which also contributes to prevention of a contact failure of the contact point. Further, by forming the base portion 157 by the first metallic material, the abrasion resistance of the entirety of the conductive segments 15a can be improved. Moreover, since gold (Au) is not used for the entirety of the conductive segments 15a, it is possible to reduce the usage amount of gold (Au) to be lower than heretofore.

Meanwhile, in the invention, it is preferable that each of the conductive segments 16a forming the second conductive pattern 16 is formed of the first metallic material which contains at least silver (Ag) and palladium (Pd) and the second metallic material which contains gold (Au) as a main component as shown in the first and second embodiments, and at least a part which is to be brought into contact with the contact point, in each of the plurality of conductive segments is formed of the second metallic material. With this, it is possible to further enhance the antideterioration and the anticorrosion of the liquid level detecting device and to suppress the manufacturing cost thereof.

Regarding the contact points 19 and 20, it is possible to use a silver-palladium (AgPd) alloy, a silver-copper (AgCu) alloy, a silver-nickel (AgNi) alloy, a silver-copper-nickel (AgCuNi) alloy or the like. The contact points 19 and 20 are manufactured such that a melted alloy (ingot) is made, a rod or wire material is formed from the ingot, drawing of a line is performed by means of a dice after that, and then a header processing (cold press) of a rod or wire material having a predetermined thickness is performed.

In accordance with the invention, gold (Au) separated by the abrasion of the second metallic material contacting with the contact point also adheres to the contact points 19 and 20 which are abraded by sliding so that a contact failure of the contact point can be prevented by the action similar to the above described one.

In addition, since the usage amount of expensive gold can be reduced, the cost of materials of the respective members can be reduced, and thereby it is possible to suppress increase of the manufacturing cost of the liquid level detecting device.

Meanwhile, the invention is not limited to the above described embodiments, and changes, modifications or the like can be made if necessary. Other than that, a material, a shape and a dimension of each component, the number of components, a placement position of each component and the like in the above embodiments are arbitrary as long as the invention can be achieved so that they are not limited.

The present application is based on Japanese Patent Application No. 2011-012181 filed on Jan. 24, 2011, the contents of which are incorporated herein by reference.

DESCRIPTION OF REFERENCE NUMERALS AND SIGNS 1 liquid level detecting device
2 sensor
3 variable resistor
4 power supply circuit
5 processing circuit
6 meter
7 fixed resistor
10 float
11 float arm
12 body frame
13 resistor plate
14 sliding unit contact element
15 first conductive pattern
15a conductive segment
15b resistor
16 second conductive pattern
16a conductive segment
17 conductive section for inputting/outputting
18 conductive section for inputting/outputting
19, 20 contact point
151 central portion
153 side portion
155 apex portion
157 base portion

What is claimed is:

1. A liquid level detecting device comprising:
a resistor plate having a plurality of conductive segments each having an outer top portion and two outer exterior end portions;
a float that vertically moves in accordance with a displacement of a liquid level of a liquid to be measured;
a float arm that has one end to which the float is attached and the other end which is rotatably supported so as to be rotated in association with a vertical movement of the float; and
a contact point that slides on the plurality of conductive segments in association with a rotation of the float arm in accordance with the liquid level of the liquid,
wherein each of the plurality of conductive segments is formed of a first metallic material and a second metallic material;
wherein the first metallic material has silver (Ag) and palladium (Pd) and the second metallic material has gold (Au) as a main component; and
wherein a part which is to be brought into contact with the contact point in each of the plurality of conductive segments is formed of the second metallic material,
wherein the outer top portion is formed of the second metallic material and the two outer exterior end portions are formed of the first metallic material.

2. The liquid level detecting device according to claim 1, wherein each of the plurality of conductive segments is shaped into a member extending in a longitudinal direction and has a central portion which is provided on the resistor plate and two side portions which are provided on the resistor plate so as to sandwich the central portion therebetween when viewed from a cross section perpendicular to the longitudinal direction of the member; and
wherein the central portion is formed of the second metallic material and each of the side portions is formed of the first metallic material.

3. The liquid level detecting device according to claim 1, wherein each of the plurality of conductive segments is shaped into a member, and has a base portion which is provided on the resistor plate and an apex portion which is superposed on an upper part of the base portion when viewed from a cross section perpendicular to a longitudinal direction of the member; and
wherein the base portion is formed of the first metallic material and the apex portion is formed of the second metallic material.

4. The liquid level detecting device according to claim 1, wherein the second metallic material contains 95% by mass or more of gold (Au).

5. The liquid level detecting device according to claim 1, wherein the second metallic material contains a glass component.

6. The liquid level detecting device according to claim 1, wherein the first metallic material contains gold (Au).

* * * * *